(12) United States Patent
O'Brien-Bernini et al.

(10) Patent No.: US 7,026,390 B2
(45) Date of Patent: Apr. 11, 2006

(54) EXTENDED BINDER COMPOSITIONS

(75) Inventors: Frank C. O'Brien-Bernini, Granville, OH (US); Liang Chen, New Albany, OH (US); Yadollah Delaviz, Granville, OH (US); Kathleen M. Bullock, Zanesville, OH (US); William E. Downey, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/325,017

(22) Filed: Dec. 19, 2002

(65) Prior Publication Data

US 2004/0122166 A1    Jun. 24, 2004

(51) Int. Cl.
*C08B 30/00* (2006.01)
*C08B 37/00* (2006.01)
*C08L 89/00* (2006.01)
*C08L 97/00* (2006.01)

(52) U.S. Cl. .................. 524/502; 524/14; 524/17; 524/25; 524/26; 524/27; 524/35; 524/47; 524/48; 524/52; 524/56

(58) Field of Classification Search .......... 524/14, 524/17, 25, 26, 27, 35, 502, 47, 48, 52, 56
See application file for complete search history.

(56) References Cited

U.S. PATENT DOCUMENTS

| | | | |
|---|---|---|---|
| 2,365,671 A | 12/1944 | Watt | |
| 2,376,607 A | 5/1945 | Lum et al. | |
| 3,919,134 A | 11/1975 | Higginbottom | |
| 4,165,302 A | 8/1979 | Armenti et al. | |
| 4,587,284 A | 5/1986 | Luissi et al. | |
| 4,888,367 A | 12/1989 | Quigley et al. | |
| 5,026,746 A | 6/1991 | Floyd et al. | |
| 5,030,507 A | 7/1991 | Mudge et al. | |
| 5,116,890 A | 5/1992 | Floyd et al. | |
| 5,192,361 A * | 3/1993 | Schilling | 524/72 |
| 5,208,075 A | 5/1993 | Kroner et al. | |
| 5,340,868 A | 8/1994 | Strauss et al. | |
| 5,428,083 A | 6/1995 | Smith et al. | |
| 5,538,761 A | 7/1996 | Taylor | |
| 5,670,585 A | 9/1997 | Taylor et al. | |
| 5,976,235 A | 11/1999 | Andersen et al. | |
| 5,977,232 A | 11/1999 | Arkens et al. | |
| 6,071,994 A | 6/2000 | Hummerich et al. | |
| 6,146,746 A | 11/2000 | Reck et al. | |
| 6,194,512 B1 | 2/2001 | Chen et al. | |
| 6,274,661 B1 | 8/2001 | Chen et al. | |
| 6,399,694 B1 | 6/2002 | McGrath et al. | |
| 6,818,694 B1 * | 11/2004 | Hindi et al. | 524/446 |

FOREIGN PATENT DOCUMENTS

| | | |
|---|---|---|
| JP | 60 099180 | 6/1985 |
| JP | 63112673 | 5/1988 |
| JP | 2000 026825 | 1/2000 |
| JP | 2000 063782 | 9/2000 |

* cited by examiner

*Primary Examiner*—Ana Woodward
(74) *Attorney, Agent, or Firm*—Inger H. Eckert; Maria C. Gasaway

(57) ABSTRACT

The present invention provides a variety of extended polyacrylic acid based binder compositions comprising a low molecular weight polyacrylic acid (typically hypophosphite or sulfite terminated), a crosslinking agent (such as triethanolamine or glycerol) and one or more water soluble materials, such as lignin, low molecular weight starch and soybean protein. The extended binder composition of the present invention provides a lower cost binder composition without degrading the performance and may be selected to alter one or more characteristics of the basic binder composition such binder wetting, emulsion compatibility, dust suppression and wash water flow properties.

31 Claims, 3 Drawing Sheets

Advanced Rheometer 1000 from TA Instruments; 30-220 C , 5 deg C / min ramp rate, .2ml sample size, 750 gap , oscillation frequency, 5% strain, 4 cm diamter sample plate

EXTENDED BINDER COMPOSITIONS

BACKGROUND OF THE INVENTION

1. Technical Field and Industrial Applicability of the Invention

The present invention relates to extended binder compositions which reduce the cost of the binder composition while simultaneously maintaining acceptable strength and binding performance and/or improving one or more binder parameters. The binder compositions of the present invention are particularly useful in the glass fiber industry in a wide range of products, for example, range insulation, duct board, pipe, ceiling board and commercial and residential insulation.

2. Background of the Invention

Glass and other organic and inorganic fibers come in various forms and can be used for a variety of applications. During the preparation and use of glass fiber products, whether produced by blowing or continuous filament manufacturing processes, the included glass fibers are easily weakened by the self-abrasive effect caused by the relative motion of adjacent fibers at points of contact. This self-abrasive effect produces surface defects in the glass fiber filaments that tend to reduce the overall mechanical strength of the product. Furthermore, glass fiber products, particularly those products destined for use as building insulation and sound attenuation, are often shipped in a compressed form in order to lower shipping costs. However, when the compressed glass fiber products are utilized at a job site, it is imperative that the glass fiber product recover a substantial amount of its precompression thickness to improve its insulation and sound attenuation properties.

Manufacture of glass fiber thermal insulation typically utilizes a continuous process in which raw batch materials are fed into a melting furnace to produce molten glass. The molten glass is then ejected from the furnace through a number of trays or bushings having small openings to form glass filaments. The initial glass filaments are then typically pulled and attenuated to produce the final fiber dimensions and cooled to form the glass fibers. The cooled fibers are then collected on a conveyor belt or other receiving surface in a forming chamber to form a mat.

The glass fibers are typically bonded together to form an integral batt or layer structure by applying a binder composition to the fibers as they are being collected on the conveyor belt. The collection of binder-coated fibers is then cured, typically in a curing oven, to evaporate remaining solvent and set the binder composition. The fibers in the resulting fiber product thus remain partially coated with a thin layer of the binder material and may exhibit greater accumulation or agglomeration at junctions formed where adjacent fibers are in contact or the spacing between them is very small. As a result of the improved strength and resiliency, the resulting fiber products exhibit higher recovery and stiffness than fiber products that do not incorporate a binder.

The residual heat from the glass fibers and the flow of air through the fibrous mat during the forming operation are generally sufficient to volatilize a majority of the water from the binder, thereby leaving the remaining components of the binder on the fibers as a viscous or semi-viscous high-solids liquid. The coated fibrous mat, which is formed in a somewhat compressed state due to the tremendous flow of air typically passing through the mat in the forming chamber, is then transferred out of the forming chamber to a transfer zone. Once in the transfer zone, the mat tends to expand vertically due to the resiliency of the glass fibers. This vertical expansion is extremely important to the successful manufacture of commercially acceptable fibrous glass thermal or acoustical insulation products.

Fiberglass insulation products prepared in this manner can be provided in various forms including batt, board (a heated and compressed batt) and molding media (an alternative form of heated and compressed batt) for use in different applications. Most fiberglass batt insulation will have a density of less than 1 lb/ft$^3$ (16 kg/m$^3$) with about 4–5 wt % being binder. Fiberglass board typically has a density of between 1 and 10 lbs/ft$^3$ (16 and 160 kg/m$^3$) with about 7–12 wt % binder while fiberglass molding media will more typically have a density between 10 and 20 lbs/ft$^3$ (160 and 320 kg/m$^3$) with at least about 12 wt % binder. The glass fibers incorporated in these products typically have diameters from about 2 to about 9 microns and may range in length from about 0.25 inch (0.64 cm) to the extremely long fibers used in forming "continuous" filament products.

As the batt of binder-coated fibers emerges from the forming chamber, it will tend to expand as a result of the resiliency of the glass fibers. The expanded batt is then typically conveyed to and through a curing oven in which heated air is passed through the insulation product to cure the binder. In addition to curing the binder, within the curing oven the insulation product may be compressed with flights or rollers to produce the desired dimensions and surface finish on the resulting blanket, batt or board product. In the case of molding media, after partially curing the binder, the fiber product is fed into a molding press that will be used to produce the final product shape and to complete the curing process. Typically, for fiber products incorporating phenolic binders the curing ovens were operated at a temperature from about 200° C. to about 325° C. and preferably from about 250° C. to about 300° C. with curing processes taking between about 30 seconds and 3 minutes.

Generally, the goal is to identify a binder system that is relatively inexpensive, is water soluble (or at least water dispersible), and can be easily applied and readily cured. The binder composition should also be sufficiently stable to permit mixing and application at temperatures ordinarily encountered in fiber product manufacturing plants. Further, the cured binder product should result in a strong bond with sufficient elasticity and thickness recovery to permit reasonable deformation and recovery of the resulting fiber product. Thickness recovery is especially important in insulation applications for both conserving storage space and providing the maximum insulating value after installation.

Phenol-formaldehyde binders are generally characterized by relatively low viscosity when uncured and the formation of a rigid thermoset polymeric matrix with the fibers when cured. A low uncured viscosity simplifies binder application and allows the binder-coated batt to expand more easily when the forming chamber compression is removed. Similarly, the rigid matrix formed by curing the binder allows a finished fiber product to be compressed for packaging and shipping and then recover to substantially its full original dimension when unpacked for installation.

Phenol/formaldehyde binders utilized in the some prior art applications have been highly alkaline resole (also referred to as resol or A-stage) type that are relatively inexpensive and are water soluble. These binders are typically applied to the fibers as an aqueous solution shortly after the fibers are formed and then cured at elevated temperatures. The curing conditions are selected both to evaporate any remaining solvent and cure the binder to a thermoset state. The fibers in the resulting product tend to be partially coated with a thin layer of the thermoset resin and exhibit accumulations of the binder composition at points where fibers touch or are positioned closely adjacent to each other.

Typically, phenol-formaldehyde resole binders used in manufactured boards and fiber insulation products release formaldehyde during curing process. Various techniques have been used to reduce formaldehyde emission from phenol/formaldehyde resins during curing including various formaldehyde scavengers that may be added to the resin during or after its preparation. Urea is a commonly used formaldehyde scavenger that is effective both during and subsequent to the manufacture of the fiber product. Urea is typically added directly to the phenol/formaldehyde resin, to produce a urea-extended phenol/formaldehyde resole resin (also referred to as "premix" or "pre-react"). Further, urea, being less expensive than the alkaline phenol/formaldehyde resoles commonly used as binders, can provide substantial cost savings for fiber product manufacturers while simultaneously reducing formaldehyde emissions.

Alternative polymeric binder systems for fibrous glass products having low molecular weight, low viscosity binders designed to allow for maximum vertical expansion of the batt as it exits the forming stage also tend to form a non-rigid plastic matrix when cured, thus reducing the vertical height recovery properties of the final product after compression. Conversely, higher viscosity binders which tend to cure to form a rigid matrix interfere with the vertical expansion of the coated, but uncured, fiber batt as it exits the forming stage.

These problems were addressed with a variety of non-phenol/formaldehyde binders exhibiting low uncured viscosity and structural rigidity when cured. These binders are often referred to as formaldehyde-free, while it is accurate that the binder is free of formaldehyde when mixed, the cured fiberglass product does include measurable amounts of formaldehyde. One such binder composition was disclosed in U.S. Pat. No. 5,318,990, which is herein incorporated, in its entirety, by reference, and utilized a polycarboxy polymer, a monomeric trihydric alcohol and a catalyst comprising an alkali metal salt of a phosphorous containing organic acid. Other binder compositions have also been developed to provide reduced emissions during the coating and curing processes utilizing compounds such as polyacrylic acid as disclosed in U.S. Pat. Nos. 5,670,585 and 5,538,761, which are herein incorporated, in their entirety, by reference.

Another polyacrylic binder composition is disclosed in U.S. Pat. No. 5,661,213, which teaches an aqueous composition comprising a polyacid, a polyol and a phosphorous-containing accelerator, wherein the ratio of the number of equivalents of the polyacid to the number of equivalents of the polyol is from about 100:1 to about 1:3.

As disclosed in U.S. Pat. No. 6,399,694, another alternative to the phenol/formaldehyde binders utilizes polyacrylic glycol (PAG) as a binder. Although more expensive, PAG binders are relatively odorless, more uniformly coat each fiber and have a generally white or light color. Indeed, fiber board products utilizing PAG binders can be provided with decorative surfaces suitable for display.

There continues to exist a need for a method of inhibiting and reducing both the corrosion and volatile organic emission issues associated with these prior art binders. A previous binder composition formulated to address the corrosion problem is disclosed in Chen et al.'s U.S. Pat. No. 6,274,661, which disclosed the addition of corrosion inhibitors including, for example, tin oxalate and thiourea, and which is incorporated herein, in its entirety, by reference.

Traditional phenol/formaldehyde resole binders continue to be very attractive as a result of their significantly lower cost. In order to make the newer binder systems more economically competitive, therefore, the search continues for extenders that will provide less expensive binder compositions while at the same time enhancing or at least substantially preserving the desirable properties of the underlying binder systems.

SUMMARY OF THE INVENTION

The underlying polyacrylic acid based binder system addressed by the present invention comprises a low molecular weight polyacrylic acid (typically hypophosphite or sulfite terminated), a crosslinking agent (such as triethanolamine or glycerol) and, optionally, a catalytic cure accelerator. As noted above, these polyacrylic acid based binder compositions are more expensive than conventional phenol/formaldehyde based binder compositions. In order to reduce the cost of the binder composition, the present invention incorporates one or more water soluble materials, such as lignin, low molecular weight starch or soybean protein, into the binder composition.

Being less expensive than the basic binder system components, each of the extender additives will reduce the overall cost of polyacrylic acid composition. In addition to reducing the cost, the extenders may be selected to alter one or more characteristics of the basic binder composition, such as the binder wetting behavior, the compatibility between oil emulsions and the binder composition, dust generation and wash water flow properties.

DETAILED DESCRIPTION OF THE INVENTION

Figure 3:
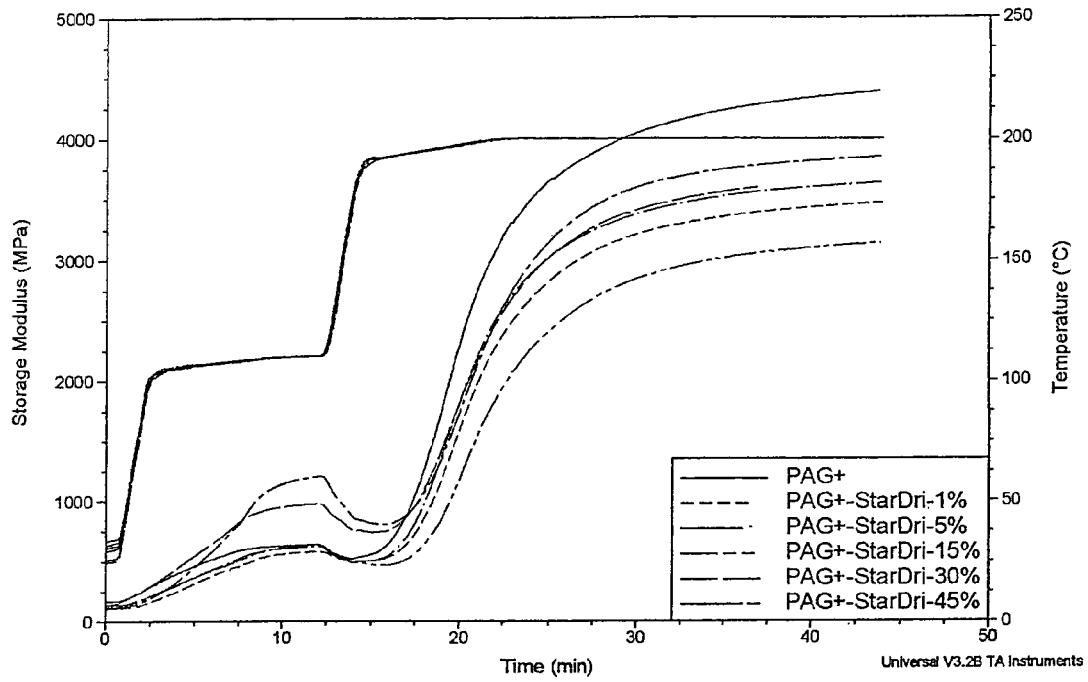
FIG. 3 is a graph comparing the cure performance of a first embodiment of the present invention using a starch extender with a comparative binder.

The basic binder according to the present invention preferably comprises an aqueous solution of a polycarboxy polymer, a monomeric trihydric alcohol, a catalyst and a pH adjuster. The viscosity of the binder composition should be relatively low, due in part to the use of the monomeric trihydric alcohol crosslinking agent, to provide acceptable vertical expansion of the fibrous glass mat as it exits the forming chamber. Ideally, the binder composition should allow for a degree of vertical expansion generally similar to that exhibited by the traditional phenol-formaldehyde binders. Although the use of monomeric reactants in low viscosity curable resins has been associated with degraded strength of the cured thermoset structure, the addition of a cure catalyst allows the basic binder composition of the present invention to form an acceptably rigid thermoset. An example of such a binder composition is disclosed in U.S. Pat. No. 5,318,990.

The polycarboxy polymer of the present invention comprises an organic polymer or oligomer containing more than one pendant carboxy group. The polycarboxy polymer may be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Alternatively, the polycarboxy polymer may be prepared from unsaturated anhydrides including, but not necessarily limited to, maleic anhydride, itaconic anhydride, acrylic anhydride, methacrylic anhydride, and the like, as well as mixtures thereof. The polymerization of these acids and anhydrides is considered to be within the abilities of one of ordinary skill in the art.

The polycarboxy polymer of the present invention may additionally comprise a copolymer of one or more of the aforementioned unsaturated carboxylic acids or anhydrides and one or more vinyl compounds including, but not necessarily limited to, styrene, .alpha.-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art.

Preferred polycarboxy polymers comprise homopolymers and copolymers of the polyacrylic acid. The preferred polyacrylic acid has a molecular weight ranging from about 100 to about 200,000; more preferably from about 1,000 to about 10,000 with about 2,000 to about 6,000 being the most preferred. In addition, the preferred polyacrylic acid has free carboxylic acid groups from greater than about 90% with greater than about 95% bring most preferred.

Contemplated equivalent trihydric alcohols according to the present invention having the same operability and utility include, but are not necessarily limited to, glycerol, trimethylolpropane, trimethylolethane, triethanolamine, 1,2,4-butanetriol, and the like, as well as mixtures thereof. In practice, the monomeric trihydric alcohols of the present invention may be mixed with other polyhydric alcohols for use in the inventive binder composition. Such other polyhydric alcohols include, but are not necessarily limited to, ethylene, glycol, 1,3-propanediol, 1,4-butanediol, 1,6-hexanediol, 2-butene-1, erythritol, pentaerythritol, sorbitol, and the like, as well as mixtures thereof. Preferred monomeric trihydric alcohols comprise glycerol and trimethylolpropane, as well as mixtures thereof. Examples of preferred trihydric alcohols include triethanolamine and glycerine.

The catalyst according to the present invention comprises an alkali metal salt of a phosphorous-containing organic acid; particularly alkali metal salts of phosphorous acid, hypophosphorous acid, and polyphosphoric acids. Examples of such catalysts include, but are not necessarily limited to, sodium, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof. Preferred catalysts include sodium hypophosphite and sodium phosphite, as well as mixtures thereof.

The binder composition according to the present invention may also include a corrosion inhibiting agent selected to reduce corrosive effects of the binder composition, particularly on metal surfaces. Corrosion inhibitors such as thiourea and other similar sulfur compounds such as allylthiourea have been found useful in this regard. Preferred inhibitors include compounds such as tin oxalate, tin sulfate, tin chloride and thiourea and, if present, are included in the binder composition in amounts ranging from about 100 to about 100,000 ppm and most preferably, from about 1,000 to about 5,000 ppm.

The polycarboxy polymer, monomeric trihydric alcohol, as well as the optional catalyst and/or corrosion inhibitor may be mixed with water in any conventional mixing device capable of providing sufficient agitation. The ratio of polycarboxy polymer to monomeric trihydric alcohol may be determined by comparing the ratio of moles of hydroxyl groups contained in the monomeric trihydric alcohol to the moles of carboxy groups contained in the polycarboxy polymer. Although this stoichiometric ratio may vary widely to include compositions having ratios of from about 0.5 to about 1.5, the more preferred binder compositions will have a ratio from about 0.7 to about 1.0.

One of ordinary skill in the art will appreciate that the amount of catalyst used may also vary quite widely depending upon the cure temperatures as well as duration of the curing period during which the binder is maintained at elevated curing temperatures. The quantity of catalyst is preferably sufficient to produce a substantially cured binder composition (i.e., at least about 75% of the stoichiometrically available carboxy and hydroxyl groups have reacted). Based upon the combined weight of the polycarboxy polymer, monomeric trihydric alcohol, and catalyst, the amount of catalyst required to achieve this desired level of performance may vary over wide limits from about 1% to about 15% by weight. It is anticipated, however, that in most instances a composition comprising between about 4% to about 8% by weight catalyst will provide sufficient performance.

The binder composition of the present invention also incorporates a functional quantity of one or more extenders to reduce the overall cost of the binder composition while maintaining acceptable thermoset binder performance. Depending on the extender or extenders selected, certain other properties of the binder composition may also be modified to adjust the binder performance for different applications. Preferred extenders include lignin, low molecular weight starch, soybean protein.

Water soluble polysaccharide extenders suitable for use in the present invention may be derived from a variety of natural products including plant, animal and microbial sources. Examples of such polysaccharides include starch, cellulose, gums, such as guar and xanthan, alginates, pectin and gellan. Suitable polysaccharide starches may include maize or corn, waxy maize, high amylose maize, potato, tapioca and wheat starch. In addition to the natural starches, genetically engineered starches such as high amylose potato and potato amylopectin starches may also be utilized as an extender in the present invention.

The preferred polysaccharides are characterized by adequate water solubility and a relatively low molecular weight, such as exhibited by certain etherized, esterified, acid hydrolyzed, dextrinized, oxidized, or enzyme modified polysaccharides. In particular, polysaccharides suitable for use in the present invention are expected to have a weight average molecular weight of not more than 10,000, and preferably less than 5,000.

Water soluble sulfonated lignins, either singly or as a mixture, are also useful as extenders in the present invention. Two such sulfonated lignins are sodium lignosulfonate and ammonium lignodulfonate, with sodium lignosulfonate being especially preferred.

Water, the primarily component of the binder composition, may be added to the mixture of polycarboxy polymer, monomeric trihydric alcohol, extender and catalyst in any amount that will produce an aqueous binder composition having the desired viscosity and flow rate for its intended application. The binder composition may be applied to the fibers in any convenient method, such as by spraying or immersion. Depending on the selection of the other components and the intended application, water may comprise up to about 95% by weight of the binder composition.

The binders of the present invention may optionally contain conventional additives such as coupling agents, dyes, oils, fillers, thermal stabilizers, flame retarding agents, lubricants, pH adjusters and the like, typically in amounts not exceeding 20% of the weight of the binder composition. In particular, pH adjusters such as ammonium hydroxide may be used to raise the pH. The preferred pH for application of the binder is from about 2.5 to about 5 with about 3 to about 4 being the most preferred.

During a typical manufacturing operation, the binder composition will be applied to glass fibers as they are being formed into a mat. The majority of the water will be evaporated from the binder composition to produce a mat coated with a binder composition having a relatively high solids content. The coated mat is then typically heated to evaporate the remaining solvent and to cure the remaining portion of the binder composition to produce a finished fibrous glass batt. Depending on its construction, the bound glass batt may be used as a thermal or acoustical insulation product, a reinforcement for a subsequently produced composite or in the production of some other fiber product.

The present invention will be further illustrated by way of the following examples:

COMPARATIVE EXAMPLE

Basic Polyacrylic Acid—Glycerol Binder

A hypophosphite terminated polyacrylic acid based resin, specifically QRXP 1629S, with glycerol as the crosslinking agent was obtained from Rohm and Haas Company. The resin was diluted with water to obtain an aqueous binder composition comprising a 30 weight percent solid aqueous solution. A Dynamic Mechanic Analysis ("DMA") was conducted to establish a reference cure curve.

EXAMPLE 1

Binders with a Lignin Extender

Figure 1:
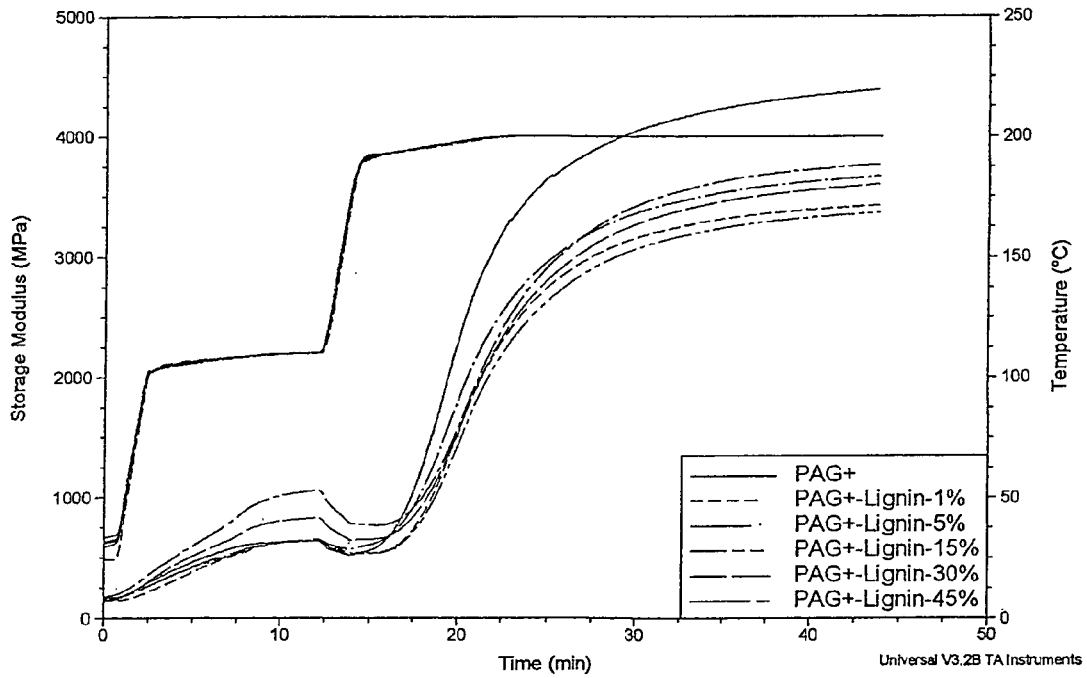
FIG. 1 is a graph comparing the cure performance of a first embodiment of the present invention using a lignin extender with a comparative binder.

The basic binder composition of the Comparative Example was prepared as described above. Sodium lignonsulfonate, specifically LIGNOSITE® 260 from the Georgia-Pacific Corporation, and water were added to the basic binder composition to obtain binder compositions comprising a 30 weight % solid aqueous solution in which the sodium lignonsulfonate:polyacrylic acid ratio was set at 1%, 5%, 15%, 30% and 45%. Additional DMA was then conducted to examine the cure performance of the extended binder compositions. The DMA data for the basic binder composition and the lignin extended binder compositions are illustrated in FIG. 1.

Figure 2:
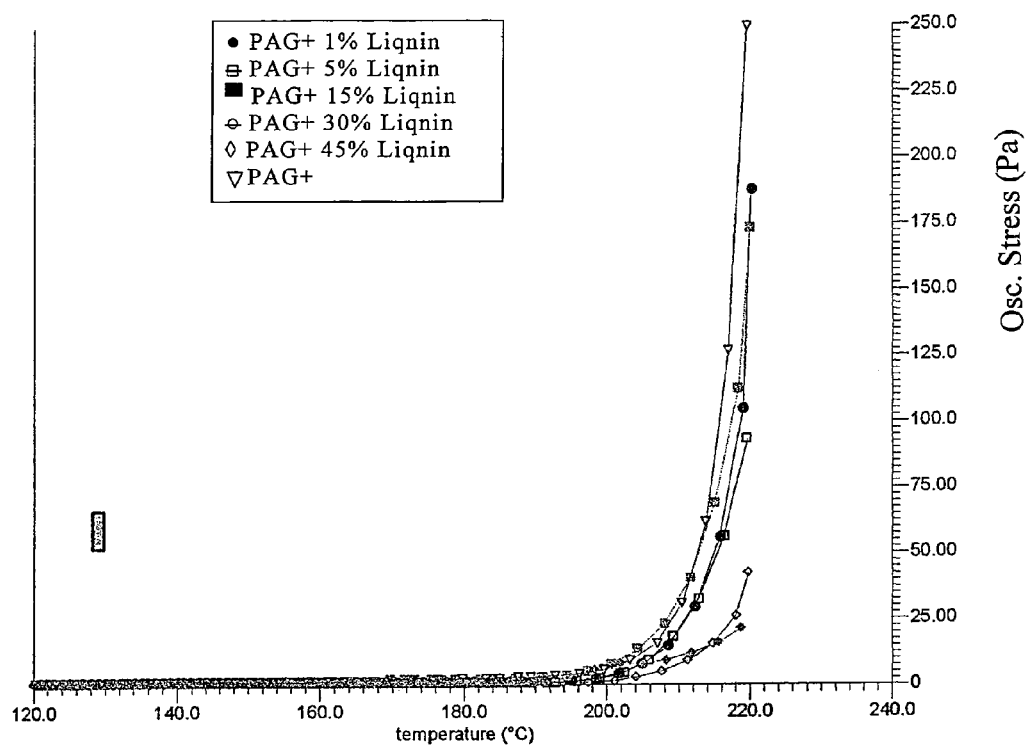
FIG. 2 is a graph reflecting the comparative rheologic performance of the lignin extended binder compositions and standard non-extended binder from FIG. 1.

The rheology of the lignin extended binders prepared in Example 1 was further examined using 0.2 ml samples analyzed on an Advanced Rheometer 1000 from TA Instruments from 30–220° C. using a 5° C. per minute ramp rate, a 4 cm diameter sample plate, a 750 µm gap, an oscillation frequency of 1 Hz and a 5% strain. The results generated for each of the samples is plotted in FIG. 2. The graph indicated that by adding lignin up to 45 weight % based on binder solid does not significantly change the initial on-set cure temperature which ranged from about 200° C. to 220° C. There was also no significant change in the cure rate (slope) observed.

EXAMPLE 2

Binders with a Low MW Starch Extender

The basic binder composition of the Comparative Example was prepared as described above. Maltodextrin, a low molecular weight and readily soluble starch, specifically STAR-DRI®) 100 from A. E. Staley Mfg. Co., and water were added to the basic binder composition to obtain binder compositions comprising a 30 weight % solid aqueous solution in which the maltodextrin:polyacrylic acid ratio was set at 1%, 5%, 15%, 30% and 45%. Additional DMA was then conducted to examine the cure performance of the extended binder compositions. The DMA data for the basic binder composition and the low molecular weight starch extended binder composition are illustrated in FIG. 3.

Figure 4:
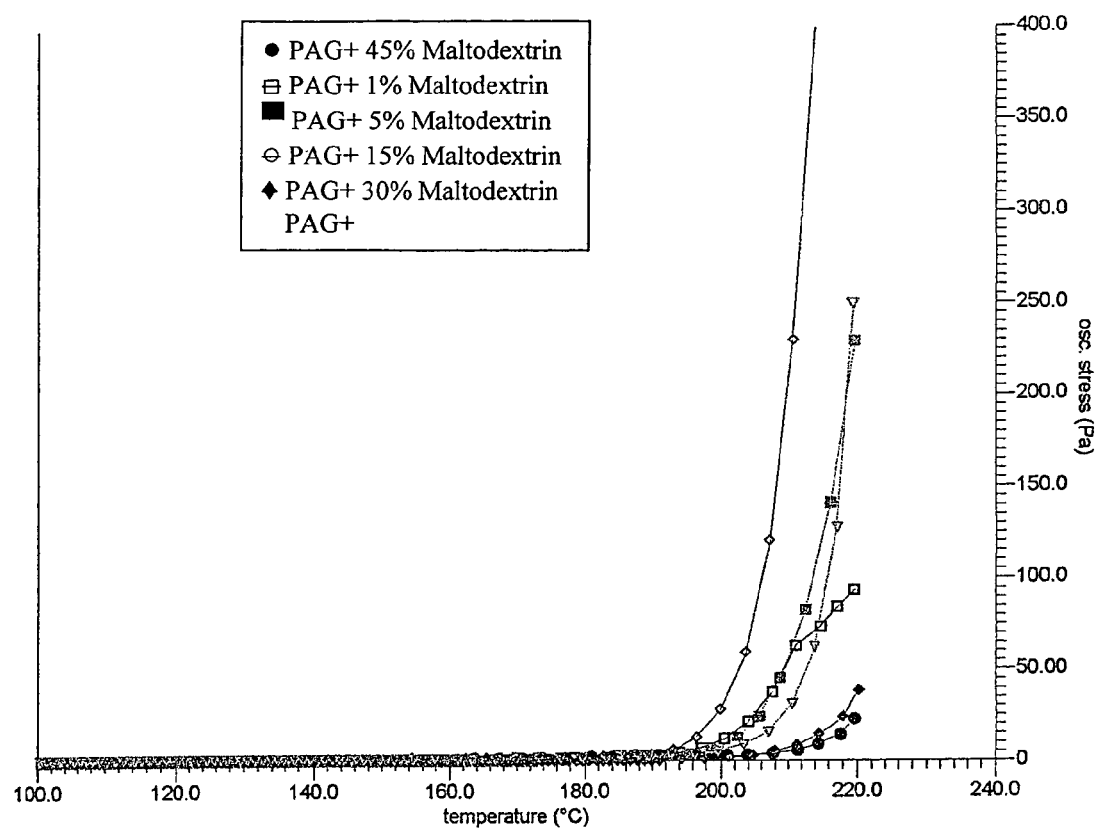
FIG. 4 is a graph reflecting the comparative rheologic performance of the starch extended binder compositions and standard non-extended binder from FIG. 1.

The rheology of the starch extended binders prepared in Example 2 was further examined using 0.2 ml samples analyzed on an Advanced Rheometer 1000 from TA Instruments from 30–220° C. using a 5° C. per minute ramp rate, a 4 cm diameter sample plate, a 750 µm gap, oscillation frequency of 1 Hz and a 5% strain. The results generated for each of the samples is plotted in FIG. 4 and similar trend was observed which implied that the addition of water soluble starch will not adversely impact on the binder cure performance.

In light of the success of initial bench trials, a plant production trial examining certain embodiments of the present invention was conducted using a polyacrylic acid glycerol (PAG Plus) binder both with and without the use of a lignin extender. Specifically, sodium lignosulphonate (S-001) from Tembec, 50% solid, was used to replace 10% of the weight of PAG Plus binder in the binder composition. The PAG Plus binder was prepared by diluting a phosphite terminated polyacrylic acid glycerol resin premix (specifically Rohm and Haas' QRXP 1629S), with water, a hydrolyzed silane and a dust suppressing agent to make a 10 wt % solid binder.

The binder compositions were then applied in a conventional manner during a standard fiber glass insulation fiberizing process and cured to produce a finished R-19 fiber glass insulation batt. A standard phenolic binder was used to produce comparative examples both before and after trial examples were produced on the same manufacturing line for comparison. Each of the trial and comparative example fiberglass batts was then tested to ascertain its recovery at end of line ("EOL"), after one week under ambient conditions and in a humidity chamber (under conditions of 90° F. and 90% relative humidity and again after six weeks of being maintained under ambient conditions or in the humidity chamber. The recovery data listed below in Table 1 demonstrates that the lignin extended polyacrylic acid glycerol binder composition can produce finished products having substantially identical recovery performance when compared with a typical phenol-formaldehyde binder composition.

TABLE 1

Production Trial for PAG Plus Extender

| Recovery (inches) | R-19 Phenolic | PAG plus | PAG Plus/Lignin | R-19 Phenolic |
|---|---|---|---|---|
| End of Line (EOL) | 6.49 | 6.13 | 6.10 | 6.00 |
| 1 Week @ Ambient | 5.97 | 5.93 | 5.51 | 6.11 |
| 1 Week @ 90° F./90% RH | 5.90 | 5.65 | 5.40 | 5.83 |
| 6 Weeks @ Ambient | 6.15 | 6.10 | 5.82 | 6.26 |
| 6 Weeks @ 90° F./90% RH | 5.97 | 6.03 | 5.70 | 6.03 |
| Average | 6.10 | 5.97 | 5.71 | 6.05 |

It will be understood that the above described preferred embodiment(s) of the present invention are susceptible to various modifications, changes, and adaptations, and the same are intended to be comprehended within the meaning and range of equivalents of the appended claims. In particular, it is anticipated that other low molecular weight proteins and starches, as well as mixtures thereof, would be suitable for use in the present invention.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

We claim:

1. An aqueous binder composition comprising:
   water;
   a polycarboxy polymer;
   a poly alcohol having at least two hydroxyl groups;
   a water-soluble extender dissolved in the water, the extender being present in an amount sufficient to establish an extender—polycarboxy polymer weight ratio of at least 1:10; and
   a cure catalyst.

2. An aqueous binder composition according to claim 1, further comprising:
   a pH adjuster.

3. An aqueous binder composition according to claim 2, further comprising:
   a corrosion inhibitor.

4. An aqueous binder composition according to claim 1, wherein
   the polycarboxy polymer is selected from a group consisting of organic polymers and oligomers containing at least two pendant carboxy groups.

5. An aqueous binder composition according to claim 4, wherein
   the polycarboxy polymer is selected from a group consisting of
   a homopolymer or copolymer prepared from one or more unsaturated carboxylic acids selected from a group consisting of acrylic acid, methacrylic acid, crotonic acid, isocrotonic acid, maleic acid, cinnamic acid, 2-methylmaleic acid, itaconic acid, 2-methylitaconic acid, and α,β-methyleneglutaric acid;
   a homopolymer or copolymer prepared from one or more unsaturated anhydrides selected from a group consisting of maleic anhydride, itaconic anhydride, acrylic anhydride, and methacrylic anhydride; and
   a copolymer of one or more unsaturated carboxylic acids or unsaturated anhydrides and one or more vinyl compounds selected from a group consisting of styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, and vinyl acetate.

6. An aqueous binder composition according to claim 4, wherein
   the polycarboxy polymer is selected from a group consisting of homopolymers and copolymers of acrylic acid, the homopolymers and copolymers being characterized by a molecular weight ranging from about 100 to about 200,000.

7. An aqueous binder composition according to claim 6, wherein
   the homopolymers and copolymers of acrylic acid being characterized by a molecular weight ranging from about 2,000 to about 6,000, and further being characterized by at least 90% free carboxylic acid groups.

8. An aqueous binder composition according to claim 1, wherein
   the extender comprises a water-soluble, low molecular weight starch.

9. An aqueous binder composition according to claim 1, wherein the extender comprises water-soluble lignin.

10. An aqueous binder composition according to claim 1, wherein
    the extender comprises a water-soluble protein.

11. An aqueous binder composition according to claim 1, wherein
    the extender is selected from a group consisting of sodium lignonsulfonate, low-molecular weight maltodextrin, and soybean protein.

12. An aqueous binder composition according to claim 1 wherein
    the extender is present in an amount sufficient to establish an extender—polycarboxy polymer weight ratio of at least 1:5.

13. An aqueous binder composition according to claim 1 wherein
    the extender is present in an amount sufficient to establish an extender—polycarboxy polymer weight ratio of at least 3:7.

14. An aqueous binder composition comprising:
    water
    a polycarboxy polymer;
    a poly alcohol having at least two hydroxyl groups; and
    a water-soluble lignin extender dissolved in the water.

15. An aqueous binder composition according to claim 14, further comprising:
    a pH adjuster.

16. An aqueous binder composition according to claim 15, further comprising:
    a corrosion inhibitor.

17. An aqueous binder composition according to claim 14, wherein
    the polycarboxy polymer is selected from a group consisting of organic polymers and oligomer containing at least two pendant carboxy groups.

18. An aqueous binder composition according to claim 17, wherein
    the polycarboxy polymer is selected from a group consisting of a homopolymer or copolymer prepared from one or more unsaturated carboxylic acids selected from a group consisting of acrylic acid, methacrylic acid, crotonic acid, isocrotonic acid, maleic acid, cinnamic acid, 2-methylmaleic acid, itaconic acid, 2-methylitaconic acid, and α,β-methyleneglutaric acid, a homopolymer or copolymer prepared from one or more unsaturated anhydrides selected from a group consisting of maleic anhydride, itaconic anhydride, acrylic anhydride, and methacrylic anhydride; and a copolymer of one or more unsaturated carboxylic acids or unsaturated anhydrides and one or more vinyl compounds selected from a group consisting of styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, and vinyl acetate.

19. An aqueous binder composition according to claim 17, wherein
the polycarboxy polymer is selected from a group consisting of homopolymers and copolymers of acrylic acid, the homopolymers and copolymers being characterized by a molecular weight ranging from about 100 to about 200,000.

20. An aqueous binder composition according to claim 19, wherein
the homopolymers and copolymers of acrylic acid being characterized by a molecular weight ranging from about 2,000 to about 6,000, and further being characterized by at least 90% free carboxylic acid groups.

21. An aqueous binder composition according to claim 14, wherein
the extender is present in an amount sufficient to establish an extender—polycarboxy polymer weight ratio of at least 1:5.

22. An aqueous binder composition according to claim 14, wherein
the extender is present in an amount sufficient to establish an extender—polycarboxy polymer weight ratio of at least 3:7.

23. An aqueous binder composition comprising:
a polycarboxy polymer;
a poly alcohol having at least two hydroxyl groups; and
soybean protein.

24. An aqueous binder composition according to claim 23, further comprising:
a pH adjuster.

25. An aqueous binder composition according to claim 24, further comprising:
a corrosion inhibitor.

26. An aqueous binder composition according to claim 23, wherein
the polycarboxy polymer is selected from a group consisting of organic polymers and oligomer containing at least two pendant carboxy groups.

27. An aqueous binder composition according to claim 26, wherein
the polycarboxy polymer is selected from a group consisting of
a homopolymer or copolymer prepared from one or more unsaturated carboxylic acids selected from a group consisting of acrylic acid, methacrylic acid, crotonic acid, isocrotonic acid, maleic acid, cinnamic acid, 2-methylmaleic acid, itaconic acid, 2-methylitaconic acid, and α,β-methyleneglutaric acid;

a homopolymer or copolymer prepared from one or more unsaturated anhydrides selected from a group consisting of maleic anhydride, itaconic anhydride, acrylic anhydride, and methacrylic anhydride; and a copolymer of one or more unsaturated carboxylic acids or unsaturated anhydrides and one or more vinyl compounds selected from a group consisting of styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, and vinyl acetate.

28. An aqueous binder composition according to claim 26, wherein
the polycarboxy polymer is selected from a group consisting of homopolymers and copolymers of acrylic acid, the homopolymers and copolymers being characterized by a molecular weight ranging from about 100 to about 200,000.

29. An aqueous binder composition according to claim 28, wherein
the homopolymers and copolymers of acrylic acid being characterized by a molecular weight ranging from about 2,000 to about 6,000, and further being characterized by at least 90% free carboxylic acid groups.

30. An aqueous binder composition according to claim 23 wherein
the extender is present in an amount sufficient to establish an extender—polycarboxy polymer weight ratio of at least 1:5.

31. An aqueous binder composition according to claim 23 wherein
the extender is present in an amount sufficient to establish an extender—polycarboxy polymer weight ratio of at least 3:7.

* * * * *

(12) EX PARTE REEXAMINATION CERTIFICATE (9878th)
United States Patent
O'Brien-Bernini et al.

(10) Number: US 7,026,390 C1
(45) Certificate Issued: Oct. 17, 2013

(54) EXTENDED BINDER COMPOSITIONS

(75) Inventors: Frank C. O'Brien-Bernini, Granville, OH (US); Liang Chen, New Albany, OH (US); Yadollah Delaviz, Granville, OH (US); Kathleen M. Bullock, Zanesville, OH (US); William E. Downey, Granville, OH (US)

(73) Assignee: Owens Corning Intellectual Capital, LLC, Toledo, OH (US)

Reexamination Request:
No. 90/012,653, Sep. 14, 2012

Reexamination Certificate for:
Patent No.: 7,026,390
Issued: Apr. 11, 2006
Appl. No.: 10/325,017
Filed: Dec. 19, 2002

(51) Int. Cl.
*C08B 30/00* (2006.01)
*C08B 37/00* (2006.01)
*C08L 89/00* (2006.01)
*C08L 97/00* (2006.01)

(52) U.S. Cl.
USPC .......... 524/502; 524/14; 524/17; 524/25; 524/26; 524/27; 524/35; 524/47; 524/48; 524/52; 524/56

(58) Field of Classification Search
None
See application file for complete search history.

(56) References Cited

To view the complete listing of prior art documents cited during the proceeding for Reexamination Control Number 90/012,653, please refer to the USPTO's public Patent Application Information Retrieval (PAIR) system under the Display References tab.

*Primary Examiner* — Timothy J Kugel

(57) ABSTRACT

The present invention provides a variety of extended polyacrylic acid based binder compositions comprising a low molecular weight polyacrylic acid (typically hypophosphite or sulfite terminated), a crosslinking agent (such as triethanolamine or glycerol) and one or more water soluble materials, such as lignin, low molecular weight starch and soybean protein. The extended binder composition of the present invention provides a lower cost binder composition without degrading the performance and may be selected to alter one or more characteristics of the basic binder composition such binder wetting, emulsion compatibility, dust suppression and wash water flow properties.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14 and 23 are determined to be patentable as amended.

Claims 2-13, 15-22 and 24-31, dependent on an amended claim, are determined to be patentable.

1. An aqueous binder composition comprising:
   water;
   a polycarboxy polymer;
   a poly alcohol having at least two hydroxyl groups;
   a water-soluble extender dissolved in the water, *forming a solution,* the extender being present in an amount sufficient to establish an extender—polycarboxy polymer weight ratio of at least 1:10; and
   a cure catalyst.

14. An aqueous binder composition comprising:
    water
    a polycarboxy polymer;
    a poly alcohol having at least two hydroxyl groups; and
    a water-soluble lignin extender dissolved in the water, *forming a solution.*

23. An aqueous binder composition comprising:
    a polycarboxy polymer;
    a poly alcohol having at least two hydroxyl groups; and
    *water soluble* soybean protein *in solution.*

* * * * *